March 30, 1926.
E. G. ROBERTS
GOLF GREEN INDICATOR
Filed Nov. 12, 1925
1,579,034
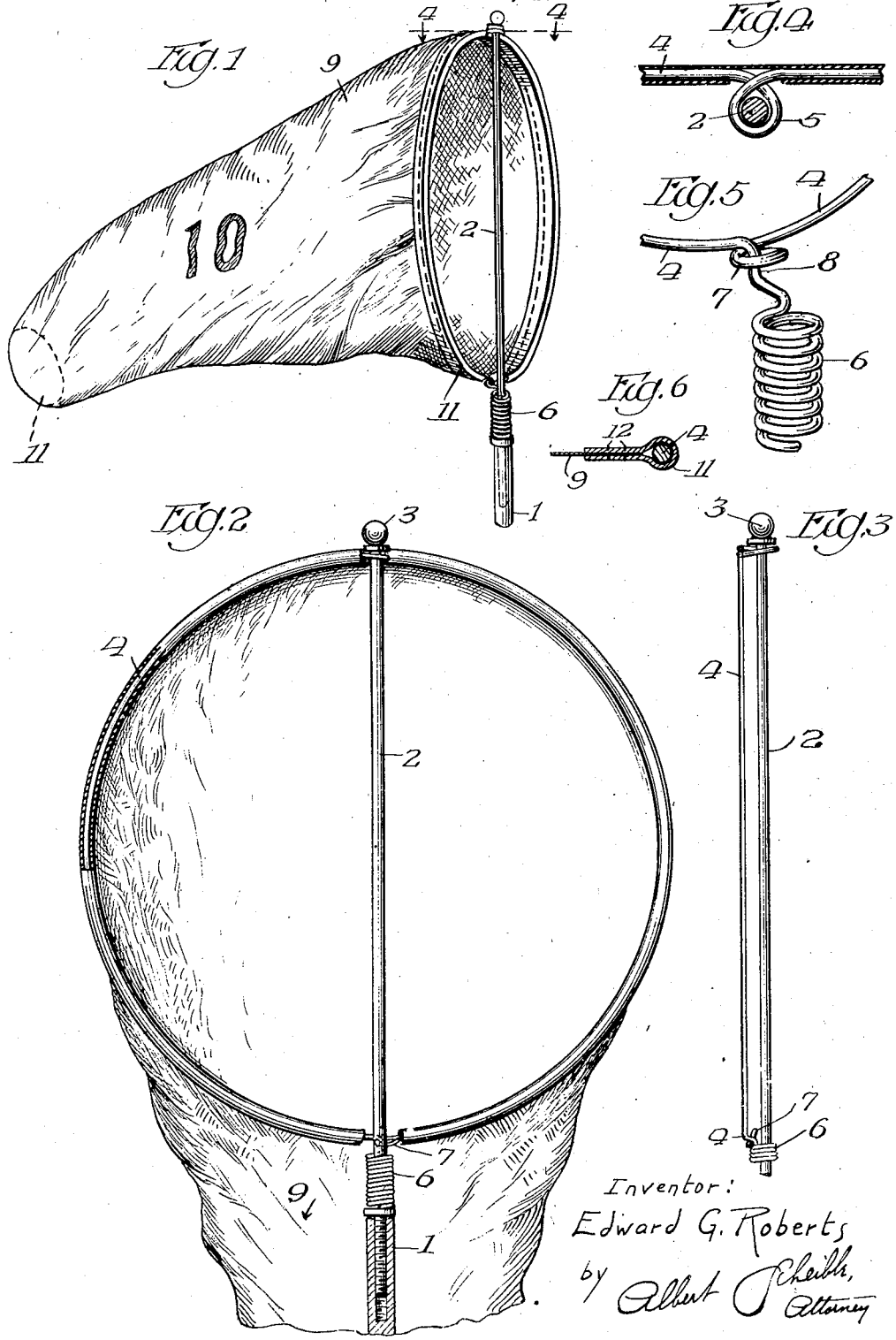
Inventor:
Edward G. Roberts
by Albert Scheibh
Attorney Patented Mar. 30, 1926.

1,579,034

UNITED STATES PATENT OFFICE.

EDWARD GEORGE ROBERTS, OF CHICAGO, ILLINOIS, ASSIGNOR TO J. OLIVER JOHNSON, INC., OF CHICAGO, ILLINOIS, A CORPORATION OF ILLINOIS.

GOLF-GREEN INDICATOR.

Application filed November 12, 1925. Serial No. 68,631.

*To all whom it may concern:*

Be it known that I, EDWARD G. ROBERTS, a citizen of the United States, and residing at Chicago, in the county of Cook and State of Illinois, have invented a new and Improved Golf-Green Indicator, of which the following is a specification.

My invention relates to an indicator for use in place of the usual flag to show the location of a hole on a golf green. Flags as commonly employed for this purpose are only partly satisfactory, as they are not readily visible from a distance by an observer who is in line with the wind with respect to the hole. Moreover, the flags whip in the wind so as to make them difficult to discern and the whipping action greatly reduces their durability. Furthermore, a considerable wind is required for raising a flag sufficiently to make it readily visible at a considerable distance unless the wind is substantially at right angles to the direction in which the golfer is looking toward the flag pole.

My invention aims to overcome all of these objections by providing a substitute for a flag which will readily be visible from all directions even in the absence of wind, which will swing up with a wind too light to raise a flag, which will readily swivel so as to indicate the direction of the wind, which will be more conspicuous than a flag to an observer who is not looking at right angles to the direction of the wind, and which will not have the undesirable whipping action.

Still further and also more detailed objects will appear from the following specification and from the accompanying drawings, in which drawings—

Fig. 1 is a perspective view of a golf green indicator embodying my invention, showing this as it appears in a moderate wind and when viewed in a direction oblique to that of the wind.

Fig. 2 is an enlarged front view of the indicator of Fig. 1, with certain portions in section.

Fig. 3 is an enlarged side view of the ring-shaped holder of the illustrated indicator and of the upper part of the supporting pole.

Fig. 4 is an enlarged horizontal section taken through the upper part of this holder and of the cloth member of the indicator along the line 4—4 of Fig. 1.

Fig. 5 is an enlarged perspective view of the lower part of the holder member.

Fig. 6 is an enlarged longitudinal section of a mouth portion of the cloth indicator member.

In the illustrated embodiment, my golf green indicator comprises a pole 1 carrying at its upper end a vertical extension rod 2 which has a knob 3 threaded upon its tip. Swiveled upon this extension rod 2 is a ring 4 member, which is desirably made of wire and which is disposed in a vertical plane, this ring having swiveling formations at its upper and lower ends through which the extension rod extends. The upper swiveling formation may consist of a simple eye 5 disposed in a plane substantially at right angles to that of the ring, as shown in Fig. 4. For the lower swiveling formation, I desirably provide a coiled wire portion of considerable length, such as the swiveling coil 6, which may be formed from one free end of the single piece of wire used by me, this coil being formed so as to have its axis in a plane parallel to the general plane of the ring and offset from the latter plane so that the axis of the coil coincides with the axis of the upper swiveling ring 5. The other free end of the wire is desirably bent into a hook 7 engaging a wire portion 8 which extends downwardly and then laterally from the bottom of the ring proper so as to connect the latter with the upper end of the swiveling coil 6.

Secured at its larger end to the ring 4 is the indicator proper, which consists of a tapering tube 9 of flexible material—desirably of cloth—which may be of any desired color and which may have the corresponding green indicating number (such as the number 10 in Fig. 1) painted or woven on it. This cloth tube 9 is here shown as provided at its larger end with a hem housing the main portion of the ring, the cloth being apertured at the top of the hem to permit the upper swiveling ring to project through it and also apertured at the bottom of the hem to allow the hook 7 and the adjacent portion of the wire part 8 to extend through the hem.

With a tapering cloth tube thus supported, and with the free end 11 of the tube considerably smaller than the end attached to the ring, the throttling action of the tapering tube on a breeze entering the tube through its larger mouth end will accelerate the velocity of the breeze while passing through the tube. Consequently, even a breeze which is too light to have an appreciable effect on a flag will lift the cloth tube considerably, so as to make this visible at long range. Moreover, even in a perfect calm, such a tube will not flatten readily and hence will be more easily visible from a distance than an ordinary flag.

To strengthen the part of the cloth tube which is secured to the main ring portion 4, I preferably do not form the hem integral with the main part of the cloth tube, but make this of a heavier strip of cloth folded on itself and overlapping the forward end portion of the tube. Thus, Fig. 6 shows a desirable construction, in which the hem part of the tubular member is made of a strip 11 of canvas, duck or the like and secured to the thinner cloth tube 9 by two rows of stitching 12. In so constructing it, I secure the greater durability of the heavier hem material while making the main portion of the tubular member of a material which is so thin and light as to be lifted easily even by slight breezes.

However, while I have described my invention in an embodiment including details of construction and arrangement believed to be highly desirable, I do not wish to be limited to these, since many changes might be made without departing either from the spirit of my invention or from the appended claims.

I claim as my invention:

1. A golf green indicator comprising a pole, a ring disposed in a vertical plane and having upper and lower swiveling formations having a common axis disposed at one side of the said plane, the pole having a portion extending through the said swiveling formations, and a tapering tube of cloth secured at its larger end to the ring and extending away from the ring.

2. A golf green indicator as per claim 1, in which one of the swiveling formations comprises a vertical tube housing a pole portion of considerable length.

3. A golf green indicator comprising a tubular cloth member, a vertical pole having a stop formation at a distance from its upper end, and a member-carrier comprising a wire bent to form a main ring portion and to form two smaller diametered ring portions disposed diametrically opposite of the main ring portion and in planes at right angles to the said main portion, the tubular cloth member being secured at one end to the said main ring portion and the pole having a portion above the stop formation extending through both of the said smaller diametered ring portions.

4. A golf green indicator as per claim 3, in combination with a retaining member detachably secured to the pole above the upper ring formation for cooperating with the stop formation in retaining the member-carrier in a predetermined position vertical of the pole.

5. A golf green indicator comprising a vertical pole having a stationary smaller diametered upper portion adjoined to the lower pole portion by a shoulder, a vertical ring provided with upper and lower swiveling portions through which the upper pole portion extends, the lower swiveling portion resting on the said shoulder, detachable retaining means interposed between the upper end of the upper pole portion and the upper swiveling formation for limiting upward movement of the ring with respect to the pole, and a tapering tubular cloth member secured at its larger end to the ring.

6. A golf green indicator comprising an upright pole, a ring member disposed in a vertical plane and swiveled adjacent to its upper and lower edges to the pole, and a tapering tubular cloth member open at both ends and having its larger end formed into an annular hem housing the major portion of the ring member, the ring member being constructed of a wire having one end detachable from other end thereof to permit the insertion of the ring into the said hem.

7. A golf green indicator comprising a tubular cloth member having one end recurved on itself to provide an annular hem and having two diametrically opposite openings in the said hem, a ring member including two substantially semi-circular portions housed by the said hem and two swiveling portions respectively projecting through the said openings at right angles to the plane of the semi-circular ring portions, and a pole having a portion extending through the two swiveling portions and provided with stop means adjacent to one of the said swiveling portions.

8. A golf green indicator comprising an upright pole, a ring member disposed in a vertical plane and swiveled adjacent to its upper and lower edges to the pole, and a tapering tubular cloth member open at both ends and having its larger end formed into an annular hem housing the major portion of the ring member; the ring member comprising a wire bent to form two semi-circular portions connected at one end by a loop disposed in a plane at right angles to the plane of the semi-circular portions, the other ends of the semi-circular portions being connected to each other and one thereof being formed into a coil through which the pole extends.

Signed at Chicago, Illinois, October 31st, 1925.

EDWARD GEORGE ROBERTS.